United States Patent
Francois et al.

(10) Patent No.: US 11,006,152 B2
(45) Date of Patent: May 11, 2021

(54) METHOD AND APPARATUS FOR ENCODING/DECODING A HIGH DYNAMIC RANGE PICTURE INTO A CODED BITSTREAM

(71) Applicant: INTERDIGITAL VC HOLDINGS, INC., Wilmington, DE (US)

(72) Inventors: Edouard Francois, Bourg des Comptes (FR); Francois Cellier, Rennes (FR); David Touze, Rennes (FR); Kangying Cai, Beijing (CN)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 77 days.

(21) Appl. No.: 16/098,861

(22) PCT Filed: Apr. 25, 2017

(86) PCT No.: PCT/EP2017/059791
§ 371 (c)(1),
(2) Date: Nov. 4, 2018

(87) PCT Pub. No.: WO2017/190985
PCT Pub. Date: Nov. 9, 2017

(65) Prior Publication Data
US 2019/0124368 A1    Apr. 25, 2019

(30) Foreign Application Priority Data

May 4, 2016    (EP) .................................... 16305525

(51) Int. Cl.
*G06K 9/36* (2006.01)
*H04N 19/98* (2014.01)
(Continued)

(52) U.S. Cl.
CPC .......... *H04N 19/98* (2014.11); *H04N 19/186* (2014.11); *H04N 19/30* (2014.11); *H04N 19/463* (2014.11); *H04N 19/85* (2014.11)

(58) Field of Classification Search
None
See application file for complete search history.

(56) References Cited

U.S. PATENT DOCUMENTS

2017/0064334 A1\* 3/2017 Minoo ..................... H04N 1/64
2017/0078706 A1\* 3/2017 Van Der Vleuten ... H04N 19/30
(Continued)

OTHER PUBLICATIONS

Bugdayci Sansli et al. "Dynamic Range Adjustment SEI Message", Joint Collaborative Team on Video Coding (JCT-VC) of ITU-T SG 16 WP 3 and ISO/IEC JTC 1/SC 29/WG 11, Document JCTVC-U0098, 21st Meeting, Warsaw, Poland, Jun. 19, 2015, pp. 1-6.
(Continued)

*Primary Examiner* — Sean M Conner
(74) *Attorney, Agent, or Firm* — Invention Mine LLC (57) ABSTRACT

A method and an apparatus for decoding at least one high dynamic range picture from a coded bitstream and a method and corresponding apparatus for coding the bitstream are disclosed. A standard dynamic range picture is decoded from the coded bitstream, a set of pivot points is decoded from the coded bitstream. The set of pivot points is representative of an adjustment function $f_{adj}$. A predefined color correction function $b_{p\_default}$ is selected. An adjusted color correction function $b_{adj}$ is determined by $1/b_{adj}[\gamma] = f_{adj}[\gamma] \times (1/b_{p\_default}[\gamma])$, where $\gamma$ is a luminance value. The high dynamic range picture is reconstructed from the decoded standard dynamic range picture and the adjusted color correction function $b_{adj}$.

12 Claims, 3 Drawing Sheets

(51) Int. Cl.
*H04N 19/463* (2014.01)
*H04N 19/30* (2014.01)
*H04N 19/186* (2014.01)
*H04N 19/85* (2014.01)

(56) References Cited

U.S. PATENT DOCUMENTS

| | | |
|---|---|---|
| 2018/0007372 A1 | 1/2018 | Lasserre et al. |
| 2018/0007392 A1 | 1/2018 | Lasserre et al. |
| 2018/0014024 A1 | 1/2018 | Lasserre et al. |
| 2018/0020224 A1* | 1/2018 | Su .................... H04N 21/47205 |
| 2018/0278967 A1* | 9/2018 | Kerofsky ................ G06T 5/009 |

OTHER PUBLICATIONS

Andrivon et al., "AVC update with Colour Remapping Information SEI message", International Organization for Standardization, Coding of Moving Pictures and Audio, ISO/IEC JTC1/SC29/WG11 MPEG2015/M35665, Geneva, Switzerland, Feb. 2015, 8 pages.

Andrivon et al., "Colour Remapping Information SEI message for AVC", International Organization for Standardization, Coding of Moving Pictures and Audio, ISO/IEC JTC1/SC29/WG11 MPEG2015/M36521, Warsaw, Poland, Jul. 2015, 11 pages.

Anonymous, "Parameter values for the HDTV standards for production and international program exchange", Recommendation ITU-R BT,709-5, International Telecommunications Union, BT Series, Broadcasting service (television), Apr. 2002, pp. 1-32.

Pascale, D., "A Review of RGB Color Spaces", The BabelColor Company, Montreal, Canada, Oct. 6, 2003, pp. 1-35.

Francois et al., "Proposed text for usage of Colour Remapping Information (CRI) SEI message for Conversion and Coding Practices for HDR/WCG Video", Joint Collaborative Team on Video Coding (JCT-VC) of ITU-T SG 16 WP 3 and ISO/IEC JTC 1/SC 29/WG 11, Document JCTVC-X0066/m38469, 24th Meeting, Geneva, Switzerland, May 19, 2016, pp. 1-4.

Anonymous, "Parameters values for ultra-high definition television systems for production and international programme exchange", International Telecommunication Union, ITU-R Radiocommunication Sector of ITU, Recommendation ITU-R BT.2020-1, Jun. 2014, pp. 1-8.

Minoo et al., "Description of the reshaper parameters derivation process in ETM reference software", Joint Collaborative Team on Video Coding (JCT-VC) of ITU-T SG 16 WP 3 and ISO/IEC JTC 1/SC 29/WG 11, Document JCTVC-W0031, 23rd Meeting, San Diego, California, USA, Feb. 19, 2016, pp. 1-17.

* cited by examiner

METHOD AND APPARATUS FOR ENCODING/DECODING A HIGH DYNAMIC RANGE PICTURE INTO A CODED BITSTREAM

This application claims the benefit, under 35 U.S.C. § 365 of International Application PCT/EP2017/059791, filed on Apr. 25, 2017, which was published in accordance with PCT Article 21(2) on Nov. 9, 2017, in English, and which claims the benefit of European Patent Application No. 16305525.4 filed on May 4, 2016.

1. TECHNICAL FIELD

The present disclosure generally relates to picture/video encoding and decoding. Particularly, but not exclusively, the technical field of the present disclosure is related to encoding/decoding of a picture whose pixels values belong to a high-dynamic range.

2. BACKGROUND ART

In the following, a color picture contains several arrays of samples (pixel values) in a specific picture/video format which specifies all information relative to the pixel values of a picture (or a video) and all information which may be used by a display and/or any other device to visualize and/or decode a picture (or video) for example. A color picture comprises at least one component, in the shape of a first array of samples, usually a luma (or luminance) component, and at least one another component, in the shape of at least one other array of samples. Or, equivalently, the same information may also be represented by a set of arrays of color samples (color components), such as the traditional tri-chromatic RGB representation.

A pixel value is represented by a vector of c values, where c is the number of components. Each value of a vector is represented with a number of bits which defines a maximal dynamic range of the pixel values.

Standard-Dynamic-Range pictures (SDR pictures) are color pictures whose luminance values are represented with a limited dynamic usually measured in power of two or f-stops. SDR pictures have a dynamic around 10 fstops, i.e. a ratio 1000 between the brightest pixels and the darkest pixels in the linear domain, and are coded with a limited number of bits (most often 8 or 10 in HDTV (High Definition Television systems) and UHDTV (Ultra-High Definition Television systems) in a non-linear domain, for instance by using the ITU-R BT.709 OETF (Optico-Electrical-Transfer-Function) (*Rec. ITU-R BT.709-5, April* 2002) or ITU-R BT.2020 OETF (*Rec. ITU-R BT.2020-1, June* 2014) to reduce the dynamic. This limited non-linear representation does not allow correct rendering of small signal variations, in particular in dark and bright luminance ranges. In High-Dynamic-Range pictures (HDR pictures), the signal dynamic is much higher (up to 20 f-stops, a ratio one million between the brightest pixels and the darkest pixels) and a new non-linear representation is needed in order to maintain a high accuracy of the signal over its entire range. In HDR pictures, raw data are usually represented in floating-point format (either 32-bit or 16-bit for each component, namely float or half-float), the most popular format being openEXR half-float format (16-bit per RGB component, i.e. 48 bits per pixel) or in integers with a long representation, typically at least 16 bits.

A color gamut is a certain complete set of colors. The most common usage refers to a set of colors which can be accurately represented in a given circumstance, such as within a given color space or by a certain output device.

Figure 8:
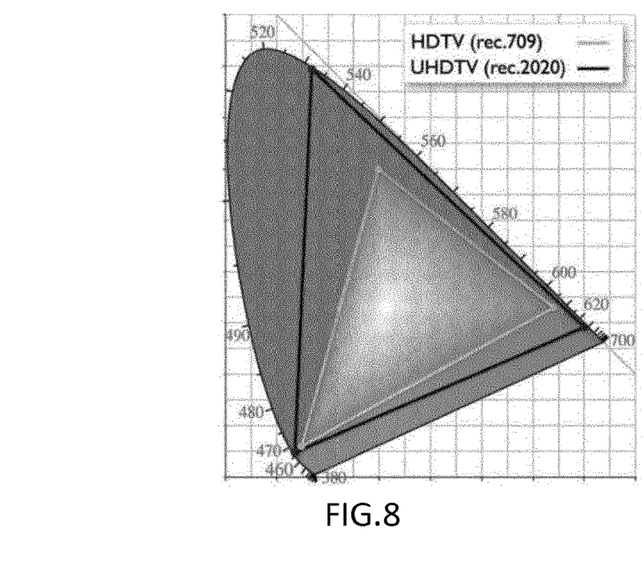
FIG. 8 shows examples of chromaticity diagrams.

A color gamut is sometimes defined by RGB primaries provided in the CIE1931 color space chromaticity diagram and a white point, as illustrated in FIG. 8.

It is common to define primaries in the so-called CIE1931 color space chromaticity diagram. This is a two dimensional diagram (x,y) defining the colors independently on the luminance component. Any color XYZ is then projected in this diagram thanks to the transform:

$$\begin{cases} x = \dfrac{X}{X+Y+Z} \\ y = \dfrac{Y}{X+Y+Z} \end{cases}$$

The z=1−x−y component is also defined but carries no extra information.

A gamut is defined in this diagram by a triangle whose vertices are the set of (x,y) coordinates of the three primaries RGB. The white point W is another given (x,y) point belonging to the triangle, usually close to the triangle center. For example, W can be defined as the center of the triangle.

A color volume is defined by a color space and a dynamic range of the values represented in said color space.

For example, a color gamut is defined by a RGB ITU-R Recommendation BT.2020 color space for UHDTV. An older standard, ITU-R Recommendation BT.709, defines a smaller color gamut for HDTV. In SDR, the dynamic range is defined officially up to 100 nits (candela per square meter) for the color volume in which data are coded, although some display technologies may show brighter pixels.

High Dynamic Range pictures (HDR pictures) are color pictures whose luminance values are represented with a HDR dynamic that is higher than the dynamic of a SDR picture.

As explained extensively in "*A Review of RGB Color Spaces*" by Danny Pascale, a change of gamut, i.e. a transform that maps the three primaries and the white point from a gamut to another, can be performed by using a 3×3 matrix in linear RGB color space. Also, a change of space from XYZ to RGB is performed by a 3×3 matrix. As a consequence, whatever RGB or XYZ are the color spaces, a change of gamut can be performed by a 3×3 matrix. For example, a gamut change from BT.2020 linear RGB to BT.709 XYZ can be performed by a 3×3 matrix.

The HDR dynamic is not yet defined by a standard but one may expect a dynamic range of up to a few thousands nits. For instance, a HDR color volume is defined by a RGB BT.2020 color space and the values represented in said RGB color space belong to a dynamic range from 0 to 4000 nits. Another example of HDR color volume is defined by a RGB BT.2020 color space and the values represented in said RGB color space belong to a dynamic range from 0 to 1000 nits.

Color-grading a picture (or a video) is a process of altering/enhancing the colors of the picture (or the video). Usually, color-grading a picture involves a change of the color volume (color space and/or dynamic range) or a change of the color gamut relative to this picture. Thus, two different color-graded versions of a same picture are versions of this picture whose values are represented in different color volumes (or color gamuts) or versions of the picture whose at least one of their colors has been altered/enhanced according to different color grades. This may involve user interactions.

For example, in cinematographic production, a picture and a video are captured using tri-chromatic cameras into RGB color values composed of 3 components (Red, Green and Blue). The RGB color values depend on the tri-chromatic characteristics (color primaries) of the sensor. A first color-graded version of the captured picture is then obtained in order to get theatrical renders (using a specific theatrical grade). Typically, the values of the first color-graded version of the captured picture are represented according to a standardized YUV format such as BT.2020 which defines parameter values for UHDTV.

The YUV format is typically performed by applying a non-linear function, so called Optical Electronic Transfer Function (OETF) on the linear RGB components to obtain non-linear components R'G'B', and then applying a color transform (usually a 3×3 matrix) on the obtained non-linear R'G'B' components to obtain the three components YUV. The first component Y is a luminance component and the two components U,V are chrominance components.

Then, a Colorist, usually in conjunction with a Director of Photography, performs a control on the color values of the first color-graded version of the captured picture by fine-tuning/tweaking some color values in order to instill an artistic intent.

The known MPEG video coders, such as HEVC standard for example, are not compatible with HDR (High Dynamic Range) video. Furthermore, a lot of displays/terminals are not compatible with the HDR video.

In order to distribute compressed HDR video to a wide variety of displays/terminals and to make it possible to use known video coding tools, such MPEG video coding standards, an HDR video is distributed as an SDR video representative of the HDR with a more limited dynamic range and a set of parameters allowing reconstruct an HDR video from the SDR video. In such a system, the SDR video is compressed using known tools, such as the standard HEVC Main 10 profile.

On the encoding side, the HDR video is first decomposed into an SDR video, such a decomposition delivering a set of parameters suitable to reconstruct at the decoder or at display level an HDR video from the decoded SDR video. Such a set of parameters may be coded with the compressed SDR video, typically in optional syntax messages, such as SEI (Supplemental Enhancement Information) messages for the HEVC standard.

Figure 3:
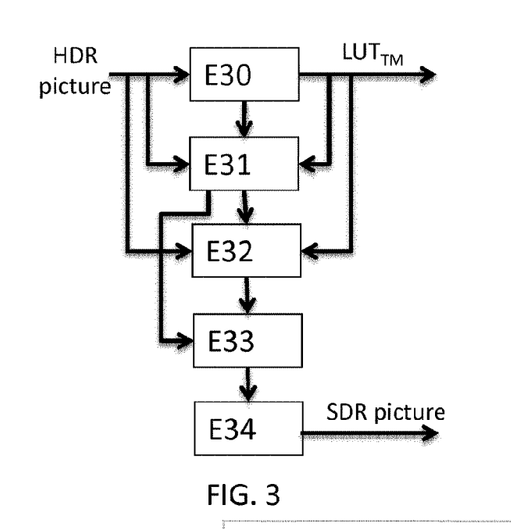
FIG. 3 illustrates a block diagram of an exemplary method for decomposing an HDR picture into an SDR picture.

FIG. 3 depicts the HDR to SDR decomposition of an HDR picture. The HDR-to-SDR decomposition process aims at converting an input linear-light 4:4:4 HDR picture, to an SDR compatible version (also in 4:4:4 format). Such a process uses side information such as the mastering display peak luminance, colour primaries, and the colour gamut of the container of the HDR and SDR pictures. Such side information are determined from the characteristics of the picture or of the video. The HDR-to-SDR decomposition process generates an SDR backward compatible version from the input HDR signal, using an invertible process that guarantees a high quality reconstructed HDR signal.

In a step E30, from the input HDR picture and its characteristics (side information), mapping variables are derived. Such a step of mapping parameters derivation delivers a luminance mapping function $LUT_{TM}$ (Look-Up-Table), which allows to map a linear-light luminance value of the HDR picture into an SDR-like luma value.

In a step E31, the luminance signal is then mapped to an SDR luma signal using the luminance mapping variables. That is for each pixel of the input HDR picture, the luminance L is derived from the HDR linar light R, G, B values of the pixel and from the luminance mapping function as:

$$L = A_1 \begin{bmatrix} R \\ G \\ B \end{bmatrix},$$

with $A=[A_1 \ A_2 \ A_3]^T$ being the conventional 3×3 R'G'B'-to-Y'CbCr conversion matrix (e.g. BT.2020 or BT.709 depending on the colour space), $A_1, A_2, A_3$ being 1×3 matrices.

The linear-light luminance L is mapped to an SDR-like luma $Y_{pre0}$, using the luminance mapping function: $Y_{pre0}=LUT_{TM}(L)$.

In a step E32, a mapping of the colour to derive the chroma components of the SDR signal is applied. The chroma components $U_{pre0}$, $V_{pre0}$ are built as follows:

A pseudo-gammatization using square-root (close to BT.709 OETF) is applied to the RGB values of the pixel $$\begin{bmatrix} R_S \\ G_S \\ B_S \end{bmatrix} = \begin{bmatrix} \sqrt{R} \\ \sqrt{G} \\ \sqrt{B} \end{bmatrix}$$

Then the $U_{pre0}$ and $V_{pre0}$ values are derived as follows $$\begin{bmatrix} U_{pre0} \\ V_{pre0} \end{bmatrix} = \begin{bmatrix} A_2 \\ A_3 \end{bmatrix} \begin{bmatrix} R_S \\ G_S \\ B_S \end{bmatrix} \times 1024$$

This step results in a gamut shifting, that is changes in colour hue and saturation compared to the input HDR signal. Such gamut shifting is corrected by a step E34 of colour gamut correction. In step E34, the chroma component values are corrected as follows:

$$\begin{bmatrix} U_{pre1} \\ V_{pre1} \end{bmatrix} = \frac{1}{b_0(Y_{pre0})} \times \begin{bmatrix} U_{pre0} \\ V_{pre0} \end{bmatrix} = \frac{1024}{b_0(Y_{pre0})} \times \begin{bmatrix} A_2 \\ A_3 \end{bmatrix} \begin{bmatrix} \sqrt{R} \\ \sqrt{G} \\ \sqrt{B} \end{bmatrix},$$

where $A_2, A_3$ are made of the second and third lines of coefficients of the conversion matrix from R'G'B'-to-Y'CbCr, and $b_0$ is a pre-processing colour correction LUT (for Look Up Table).

The luma component is corrected as follows:

$$Y_{pre1}=Y_{pre0}-v \times \max(0, a \times U_{pre1}+b \times V_{pre1}),$$

where a and b are pre-defined parameters and v is a control parameter enabling to control the saturation.

The higher the value Y is, the less the picture is satured.

The HDR picture to SDR picture decomposition results in an output SDR picture with pixels arrays $Y_{pre1}U_{pre1}V_{pre1}$.

Figure 4:
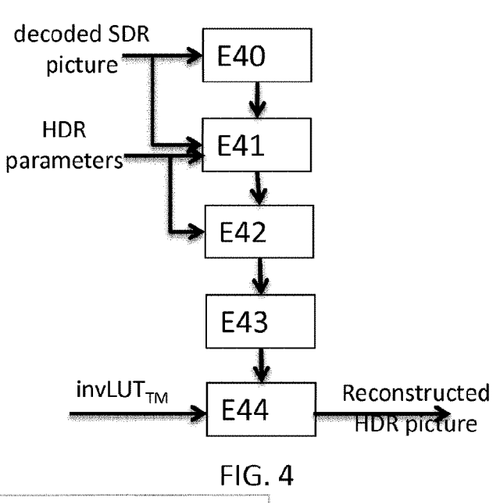
FIG. 4 illustrates a block diagram of an exemplary method for reconstructing an HDR picture from an SDR picture decoded from a coded bitstream.

The HDR reconstruction process is the inverse of the HDR-to-SDR decomposition process. FIG. 4 illustrates such an HDR reconstruction process. A decoded SDR picture comprises 3 arrays of pixels $SDR_y, SDR_{cb}, SDR_{cr}$ corresponding respectively to the luma and chroma components of the picture. The HDR reconstruction process the following steps for each pixel of the SDR picture.

In a step E40, the values $U_{post1}$ and $V_{post1}$ are derived as follows for each pixel (x,y) of the SDR picture:

$$\begin{cases} U_{post1} = SDR_{cb}[x][y] - midSampleVal \\ V_{post1} = SDR_{cr}[x][y] - midSampleVal \end{cases}$$

where midSampleVal is a predefined shifting constant.

In a step E41, the value $Y_{post1}$ for the pixel (x,y) of the SDR picture is derived as follows:

$Y_{post1} = SDR_y[x][y] + v \times \max(0, a \times U_{post1} + b \times V_{post1})$, where a and b are the same pre-defined parameters and v is a control parameter enabling to control the saturation, as in the decomposition process. Therefore, such parameters should be known to the reconstruction module. They may be part of HDR parameters coded with the compressed SDR picture or are predefined at the decoder.

Such a step may possibly be followed by a clipping to avoid being out of the legacy signal range.

In a step E42, colour correction is performed. In step E42, $U_{post1}$ and $V_{post1}$ are modified as follows:

$$\begin{cases} U_{post1} = b_P[Y_{post1}] \times U_{post1} \\ V_{post1} = b_P[Y_{post1}] \times V_{post1} \end{cases}$$

where $b_p$ is a post-processing colour correction LUT, that depends directly on the pre-processing colour correction $LUTb_0$.

The post-processing colour correction LUT $b_p$ can be determined by:

$$b_p(Y) = \frac{b_O(Y)}{K \times \sqrt{L(Y)}} \qquad (eq.\ 1)$$

where K is a constant value, L is the linear-light luminance derived from $L = invLUT_{TM}[Y]$, with $invLUT_{TM}$ being the inverse function of the $LUT_{TM}$, and Y the luma value of the SDR signal.

In step E43, RGB ($HDR_R$, $HDR_G$, $HDR_B$) values of pixels are reconstructed. In step E43, a value T is derived as:

$T = k0 \times U_{post1} \times V_{post1} + k1 \times U_{post1} \times U_{post1} + k2 \times V_{post1} \times V_{post1}$ where k0, k1, k2 are predefined values depending on the SDR colour gamut. The value S0 is then initialized to 0, and the following applies:

If (T≤1), S0 is set to Sqrt(1−T)

Else, $U_{post1}$ and $V_{post1}$ are modified as follows:

$$\begin{cases} U_{post1} = \dfrac{U_{post1}}{\sqrt{T}} \\ V_{post1} = \dfrac{V_{post1}}{\sqrt{T}} \end{cases}$$

The values R1, G1, B1 are derived as follows.

$$\begin{bmatrix} R1 \\ G1 \\ B1 \end{bmatrix} = M_{Y'CbCr \to R'G'B'} \times \begin{bmatrix} S0 \\ U_{post1} \\ V_{post1} \end{bmatrix}$$

where $M_{Y'CbCr\text{-}to\text{-}R'G'B'}$ is the conventional conversion matrix from Y'CbCr to R'G'B'.

In a step E44, the RGB values from the HDR picture are then reconstructed from the SDR RGB values. In step E44, the values R2, G2, B2 are derived from R1, G1, B1 as follows:

$$\begin{cases} R2 = invLUT[Y_{post1}] \times R1 \\ G2 = invLUT[Y_{post1}] \times G1 \\ B2 = invLUT[Y_{post1}] \times B1 \end{cases}$$

where invLUT corresponds to the square-root of the inverse look-up-table $LUT_{TM}$ derived from the luma mapping parameters transmitted to the reconstruction module.

And the output samples $HDR_R$, $HDR_G$, $HDR_B$ are derived from R2, G2, B2 as follows:

$$\begin{cases} HDR_R = R2^2 \\ HDR_G = G2^2 \\ HDR_B = B2^2 \end{cases}$$

A clipping may be applied to limit the range of the output HDR signal.

It can be seen that such decomposition and reconstruction processes use pre-processing and post-processing colour correction functions $b_0$ and $b_p$ which are linked by equation (eq. 1).

In order to distribute an SDR video signal representative of a high fidelity HDR video signal, the computation of the pre-processing colour correction $b_0$ is performed at the encoding side by a minimization of a reconstruction error between the RGB SDR signal and the RGB HDR signal. Such a minimization operation is controlled by a saturation parameter (saturation skew) computed for each picture of the video and enables to control the color saturation of the derived SDR signal. Therefore, the pre-processing colour correction function $b_0$, and thus the post-processing colour correction function $b_p$, are dependent from the original HDR pictures of the HDR video. The same derivation process of the post-processing colour correction function $b_p$ can not be applied at the decoder side.

Instead, at the decoder side, a set of pre-defined default LUTs $b_{P\_default}[k]$, k=1 to N, is used. For instance, one LUT is defined for each triple (container colour gamut, content colour gamut, peak luminance). At the pre-processing side, an adjustment function $f_{adj}$ is built to map as much as possible the LUT $b_{P\_default}[k]$ to the real LUT $b_p$, that is such that $$b_{P\_cod}[Y] = f_{adj}[Y] \times b_{P\_default}[k][Y] \qquad (eq.\ 2)$$

is as close as possible to $b_p[Y]$ for all Y values, where $b_p$ is derived from the pre-processing colour correction function $b_0$ using equation eq. 1.

To limit the coding cost, the function $f_{adj}$ is modeled using pivot points of a piece-wise linear model (PWL). Only these PWL pivot points are coded. At the post-processing step, these points can then be decoded, the function $f_{adj}$ is built and the $b_{P\_cod}$ LUT is reconstructed from the default LUT $b_{P\_default}$, which is identified thanks to the coded content characteristics parameters, and $f_{adj}$ by applying equation eq. 2.

Figure 9:
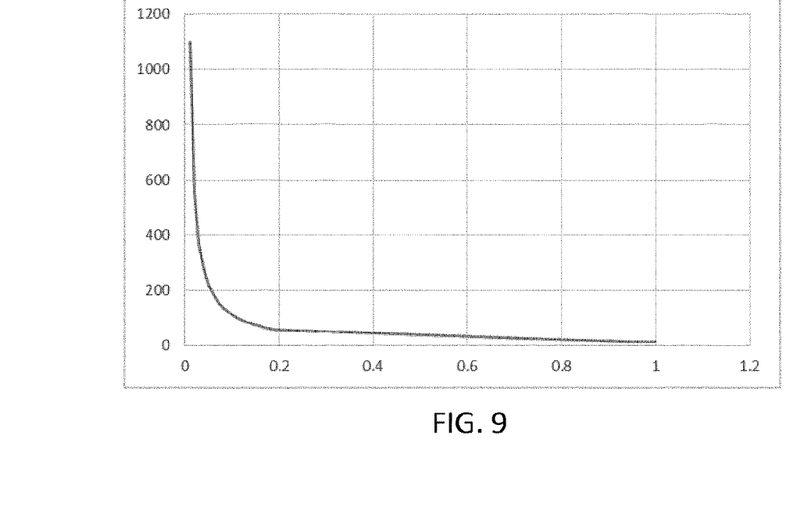
FIG. 9 shows an example of LUT $b_p$ with a normalized range of Y values representative of post-processing colour correction function used in the decoding scheme disclosed herein.

The LUT $b_p$ has typically a shape close to the function A/Y, A being a constant, and Y being the luminance values, as shown in FIG. 9. FIG. 9 shows an example of LUT $b_p$ with a normalized range of Y values. Such a shape leads to a large slope for small Y values. Therefore a small error in $f_{adj}$ for small values of Y may lead to large errors in $b_p$, thus degrading the quality and fidelity reconstruction of the decoded HDR signal. There is thus a need for improving quality of HDR picture reconstructed from a compressed standard dynamic range picture.

3. SUMMARY

According to an aspect of the present principle, a method for decoding at least one high dynamic range picture from a coded bitstream is disclosed. Such a method comprises:
   a step of decoding a standard dynamic range picture from said coded bitstream,
   a step of decoding a set of pivot points from said coded bitstream, said set of pivot points being representative of an adjustment function $f_{adj}$,
   a step of selecting a predefined colour correction function $b_{p\_default}$,
   a step of determining an adjusted colour correction function $b_{adj}$ by:

$$1/b_{adj}[Y]=f_{adj}[Y]\times(1/b_{p\_default}[Y]),$$

where Y is a luminance value,
   a step of reconstructing the high dynamic range picture from the decoded standard dynamic range picture and the adjusted colour correction function $b_{adj}$.

According to this principle, the reconstruction errors on the reconstructed high dynamic range picture are limited. The post-processing colour correction function $b_{adj}$ used at the decoder is more finally modeled from the real post-processing colour correction $b_p$ using the given equation. The shape of $1/b_{adj}$ is close to a straight line (with a consistent slope over the range of Y values), as the shape of LUT $1/b_p$. Therefore, the present principle makes it possible to better control the error along the full range of Y values, with a more consistent amplitude along this range.

Another aspect of the disclosure is a method for coding at least one high dynamic range picture into a coded bitstream. Said method comprises:
   a step of decomposing said high dynamic range picture, into a standard dynamic range picture, using at least a pre-processing colour correction function $b_0$,
   a step of determining a post-processing colour correction function $b_p$ from said pre-processing colour correction function $b_0$,
   a step of selecting a predefined colour correction function $b_{p\_default}$,
   a step of determining an adjustment function $f_{adj}$ used to adjust said predefined colour correction function $b_{p\_default}$, delivering an adjusted colour correction function $b_{adj}$, by:

$$1/b_{adj}[Y]=f_{adj}[Y]\times(1/b_{p\_default}[Y]),$$

where Y is a luminance value,
   wherein said step of determining said adjustment function $f_{adj}$ comprises performing a minimization of an error between $1/b_p$ and $1/b_{adj}$,
   a step of encoding a set of pivot points into said coded bitstream, said set of pivot points being representative of said determined adjustment function $f_{adj}$,
   a step of encoding said standard dynamic range picture into said coded bitstream.

Another aspect of the disclosure is an apparatus for decoding at least one high dynamic range picture from a coded bitstream. Said decoding apparatus comprises:
   means for decoding a standard dynamic range picture from said coded bitstream,
   means for decoding a set of pivot points from said coded bitstream, said set of pivot points being representative of an adjustment function $f_{adj}$,
   means for selecting a predefined colour correction function $b_{p\_default}$,
   means for determining an adjusted colour correction function $b_{adj}$ by:

$$1/b_{adj}[Y]=f_{adj}[Y]\times(1/b_{p\_default}[Y]),$$

where Y is a luminance value,
   means for reconstructing the high dynamic range picture from the decoded standard dynamic range picture and the adjusted colour correction function $b_{adj}$.

Another aspect of the disclosure is an apparatus for encoding at least one high dynamic range picture into a coded bitstream. Said encoding apparatus comprises:
   means for decomposing said high dynamic range picture, into a standard dynamic range picture, using a pre-processing colour correction function $b_0$,
   means for determining a post-processing colour correction function $b_p$ from said pre-processing colour correction function $b_0$,
   means for selecting a predefined colour correction function $b_{p\_default}$,
   means for determining an adjustment function $f_{adj}$ used to adjust said predefined colour correction function $b_{p\_default}$, delivering an adjusted colour correction function $b_{adj}$, by:

$$1/b_{adj}[Y]=f_{adj}[Y]\times(1/b_{p\_default}[Y]),$$

where Y is a luminance value,
by performing a minimization of an error between $1/b_p$ and $1/b_{adj}$,
   means for encoding a set of pivot points into said coded bitstream, said set of pivot points being representative of said determined adjustment function $f_{adj}$,
   means for encoding said standard dynamic range picture into said coded bitstream.

Another aspect of the disclosure is a computer program comprising software code instructions for performing the method according to any embodiments of the present principle, when the computer program is executed by a processor.

Another aspect of the disclosure is a bitstream representative of at least one coded high dynamic range picture. Such a bitstream comprises:
   coded data representative of at least one standard dynamic range picture obtained from said high dynamic range picture,
   coded data representative of:
      a set of pivot points representative of an adjustment function $f_{adj}$ used to adjust a predetermined colour correction function $b_{p\_default}$, delivering an adjusted colour correction function $b_{adj}$, said adjusted colour correction function $b_{adj}$ being determined by $1/b_{adj}[Y]=f_{adj}[Y]\times(1/b_{p\_default}[Y])$, where Y is a luminance value, said adjusted colour correction function $b_{adj}$ being used for reconstructing said high dynamic range picture from said standard dynamic range picture decoded.

A non-transitory processor readable medium having stored thereon a bitstream is disclosed wherein the bitstream comprises:
coded data representative of at least one standard dynamic range picture obtained from said high dynamic range picture,
coded data representative of:
a set of pivot points representative of an adjustment function $f_{adj}$ used to adjust a predetermined colour correction function $b_{p\_default}$, delivering an adjusted colour correction function $b_{adj}$, said adjusted colour correction function $b_{adj}$ being determined by $1/b_{adj}[Y]=f_{adj}[Y]\times(1/b_{p\_default}[Y])$, where Y is a luminance value, said adjusted colour correction function $b_{adj}$ being used for reconstructing said high dynamic range picture from said standard dynamic range picture decoded.

5. DESCRIPTION OF EMBODIMENTS

In the following the encoding/decoding method are described using an HEVC coding tools, however the encoding/decoding method described herein are independent of the coding tools used for coding an SDR picture and the HDR parameters as side information for reconstructing an HDR picture from the compressed SDR picture. Therefore, the principle disclosed herein applies to any coding tools suitable for coding/decoding an SDR picture and side information.

In the following description of the embodiments, when it is referred of a LUT (for Look-Up-Table) of a function f, it should be understood that the operation performed by the function f is implemented using a LUT comprising pre-calculated values of the function f for a set of luma values. In the following, the references to the function for LUT f refer to the same function, the LUT f being a faster implementation of the function f.

Figure 1:
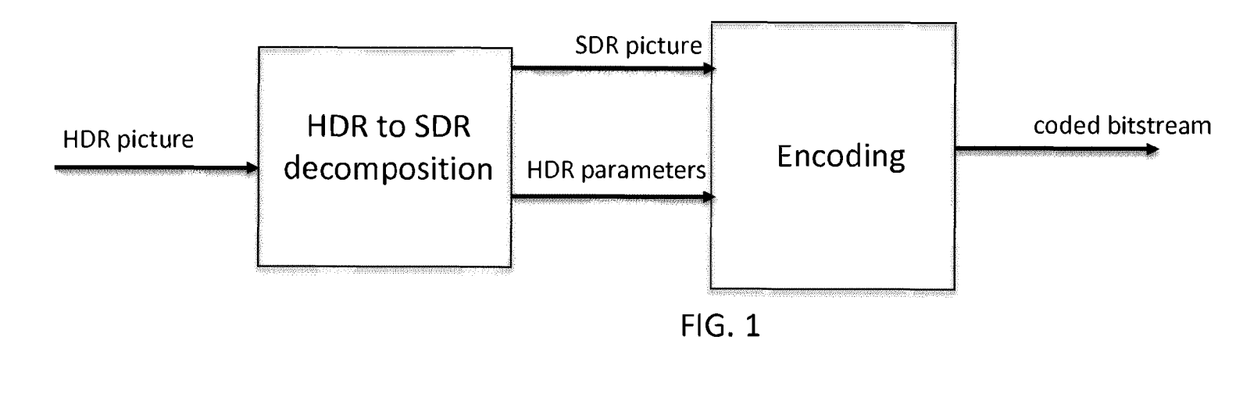
FIG. 1 illustrates an exemplary system for encoding an HDR picture into a coded bitstream according to an embodiment of the present principle.

FIG. 1 illustrates an exemplary system for encoding an HDR picture into a coded bitstream according to an embodiment of the present principle. Such an encoding system may be used for distributing a compressed HDR video while at the same time distributing an associated SDR video representative of the HDR video with a more limited dynamic range. Such an encoding system provides a solution for SDR backward compatible HDR distribution.

The disclosure is described for encoding/decoding a color HDR picture but extends to the encoding/decoding of a sequence of pictures (video) because each color picture of the sequence is sequentially encoded/decoded as described below.

An HDR picture is first input to a module of HDR to SDR decomposition. Such a module performs HDR to SDR decomposition and outputs an SDR picture which is a dynamic reduced version of the input HDR picture.

The output SDR picture is a reshaped version of the input HDR picture such that the hue and perceived saturation are preserved and the visual quality of the SDR picture relative to the HDR picture is increased. The HDR to SDR decomposition module also outputs a set of HDR parameters which are further used for HDR picture reconstruction.

Such a set of HDR parameters comprises at least luma mapping parameters allowing to derive an inverse luma mapping table (LUT) for converting SDR luma to HDR luminance.

The SDR picture is then input to an encoding module performing picture encoding. Such an encoding module may be for example an HEVC Main 10 coder suitable for encoding video and picture represented on a 10 bit-depth. The encoding module outputs a coded bitstream representative of a compressed version of SDR picture. The HDR parameters are also encoded by the encoding module as part of the coded bitstream. As an example, such HDR parameters may be coded in SEI message (Supplemental Enhancement Information message) of an HEVC Main 10 bitstream.

Such a coded bitstream may then be stored or transmitted over a transmission medium.

Figure 5:
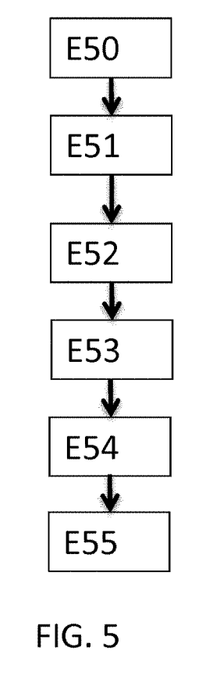
FIG. 5 illustrates a block diagram of an exemplary method for coding an HDR picture into a coded bitstream according to an embodiment of the present principle.

The method steps of the encoding system presented here are further describes according to various embodiments disclosed herein with FIG. 5.

Figure 2:
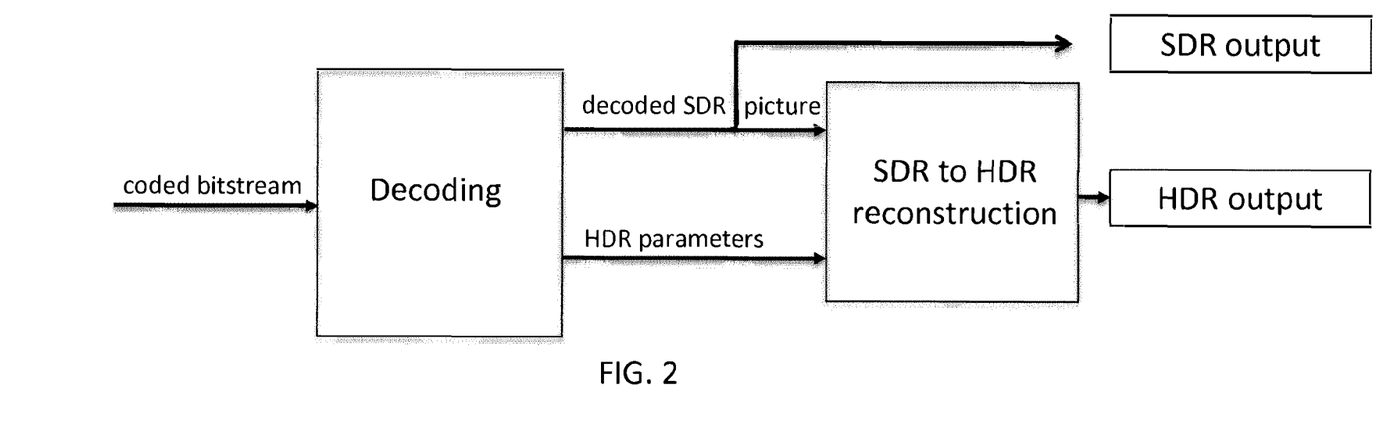
FIG. 2 illustrates an exemplary system for decoding an HDR picture into a coded bitstream according to an embodiment of the present principle.

FIG. 2 illustrates an exemplary system for decoding an HDR picture from a coded bitstream according to an embodiment of the present principle. As an example, the coded bitstream is conformed to the HEVC Main 10 profile.

Such a coded bitstream comprises coded data representative of an SDR picture and coded data representative of HDR parameters suitable for reconstructing an HDR picture from a decoded version of the SDR picture compressed in the coded bitstream.

Such a coded bitstream may be stored in a memory or received from a transmission medium.

The coded bitstream is first input to a decoding module performing picture decoding and HDR parameters decoding. The decoding module may be for example a decoder conformed to an HEVC Main 10 profile decoder.

The decoding module outputs a decoded SDR picture and a set of HDR parameters. The decoded SDR picture may be displayed by a legacy SDR display (SDR output). Such an SDR picture may be viewable by an end-user from his legacy SDR display. Thus, the disclosed system is backward compatible with any SDR legacy display.

The decoded SDR picture and HDR parameters are then input to a module for SDR to HDR reconstruction. Such a module reconstructs the HDR picture from the decoded SDR picture using the given HDR parameters. Then, a decoded HDR picture is output and can be displayed by an HDR compatible display (HDR output).

Figure 6:
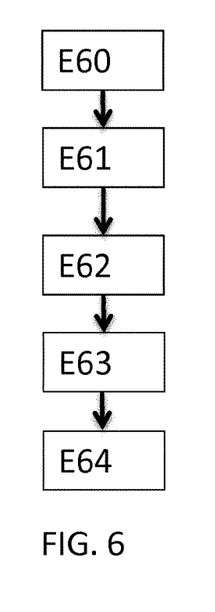
FIG. 6 illustrates a block diagram of an exemplary method for decoding an HDR picture from a coded bitstream according to an embodiment of the present principle.

The decoding method steps of the decoding system presented here are further describes according to various embodiments disclosed herein with FIG. 6.

1—Coding an HDR Picture into a Coded Bitstream:

FIG. 5 illustrates a block diagram of an exemplary method for coding an HDR picture into a coded bitstream according to an embodiment of the present principle.

In a step E50, an HDR picture is decomposed into an SDR picture. Such HDR to SDR decomposition is performed similarly to the decomposition process explained in reference with FIG. 3. The decomposition process uses a pre-processing colour correction function $b_0$.

In a step E51, a post-processing colour correction function $b_p$ is determined from said pre-processing colour correction function $b_0$ using equation eq. 1 as explained above.

In a step E52, a predefined colour correction function $b_{p\_default}$ is selected among a set of predefined colour correction function $b_{p\_default}$. Such function $b_{p\_default}$ is selected according to content characteristics of the HDR picture or of the sequence to which the HDR picture belongs. Such predefined colour correction function set is known to the decoder.

In a step E53, an adjustment function $f_{adj}$ is determined. Such adjustment function is used to adjust said predefined colour correction function $b_{p\_default}$, so as to deliver an adjusted colour correction function $b_{adj}$. With the present principle, the adjustment function $f_{adj}$ is defined as follow:

$$1/b_{adj}[Y] = f_{adj}[Y] \times (1/b_{p\_default}[Y]),$$

where Y is a luminance value,

Said adjustment function $f_{adj}$ is determined by performing a minimization of an error between $1/b_p$ and $1/b_{adj}$ for all Y values. For instance, a least square method could be used to estimate the function $f_{adj}$. The resulting $f_{adj}$ function is a piece-wise linear function that is then approximated by a set of pivot points $(Y_i, f_{adj}[Y_i])$, for i=0 to $(N_{pwl}-1)$, to limit the coding cost.

In a least mean square approach, the function $f_{adj}$ is computed so that the error $$E = \sum_{Y=0}^{Y_{max}} \left( \frac{1}{b_p[Y]} - \frac{1}{b_{adj}[Y]} \right)^2 = \sum_{Y=0}^{Y_{max}} \left( \frac{1}{b_p[Y]} - f_{adj}[Y] \times \frac{1}{b_{p\_default}[Y]} \right)^2$$

is minimal, where $Y_{max}$ is the maximum possible value of Y, and where $f_{adj}[Y]$ is derived as follows:

$$f_{adj}[Y] = f_{adj}[Y_i] + (Y-Y_i)/(Y_{i+1}-Y_i) \times (f_{adj}[Y_{i+1}] - f_{adj}[Y_i])$$
for any Y in $[Y_i, Y_{i+1}]$ One possible algorithm for performing this minimization is the following.

The piece-wise linear function $f_{adj}$ is initialized with $N_{pwl} = (Y_{max}-1)$ points, wherein each point $(Y_i, f_{adj}[Y_i])$, for i=0 to $(Y_{max}-1)$, being defined as:

$$Y_i = i$$

$$f_{adj}[Y_i] = \frac{b_{p\_default}[Y_i]}{b_p[Y_i]}$$

The corresponding error E is also derived.

Then, while $N_{pwl}$ is larger than the target number of points (typically 6 points), the point $(Y_k, f_{adj}[Y_k])$, that, when it is removed, generates the smallest error E, is identified and removed from the list of pivot points representative of $f_{adj}$. This is done by testing each one of the remaining $N_{pwl}$ pivot points, computing the corresponding error $E_k$ resulting from the piece-wise linear function $f_{adj}$ generated without this point. The point for which $E_k$ is minimum is removed and $N_{pwl}$ is decreased by one. The process is re-iterated until $N_{pwl}$ has reached the target number of pivot points.

In a step E54, such a set of pivot points is coded into a coded bitstream. Such set of pivot points is for example coded as part of HRD parameters as explained in the coding system of FIG. 1.

In a step E55, the SDR picture is also coded into said coded bitstream, as described in relation with FIG. 1.

2—Decoding an HDR Picture from a Coded Bitstream:

FIG. 6 illustrates a block diagram of an exemplary method for decoding an HDR picture from a coded bitstream according to an embodiment of the present principle.

In a step E60, an SDR picture is decoded from said coded bitstream.

In a step E61, a set of pivot points is decoded from said coded bitstream. Said set of pivot points is representative of an adjustment function $f_{adj}$.

In a step E62, a predefined colour correction function $b_{p\_default}$ is selected among a set of predefined colour correction function $b_{p\_default}[k]$. Such set of predefined colour correction function $b_{p\_default}[k]$ is the same as the one defined at the encoder, in relation with FIG. 5. Such function $b_{p\_default}$ is selected according to content characteristics of the HDR picture or of the sequence to which the HDR picture belongs. Such content characteristics are transmitted to the decoded as side information or along with the HDR parameters described in relation with FIG. 2.

In a step E63, an adjusted colour correction function $b_{adj}$ is built according to:

$$1/b_{adj}[Y] = f_{adj}[Y] \times (1/b_{p\_default}[Y],$$

where Y is a luminance value, where adjustment function $f_{adj}$ is rebuilt from the decoded set of pivot points.

Then in a step E64, the HDR picture is reconstructed from the decoded SDR picture and the adjusted colour correction function $b_{adj}$, similarly as in the reconstruction process described in reference with FIG. 4.

On FIGS. 1 to 6, the method steps are performed by modules, which are functional units, such modules may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the disclosure are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a device or from a blend of hardware and software components.

Figure 7:
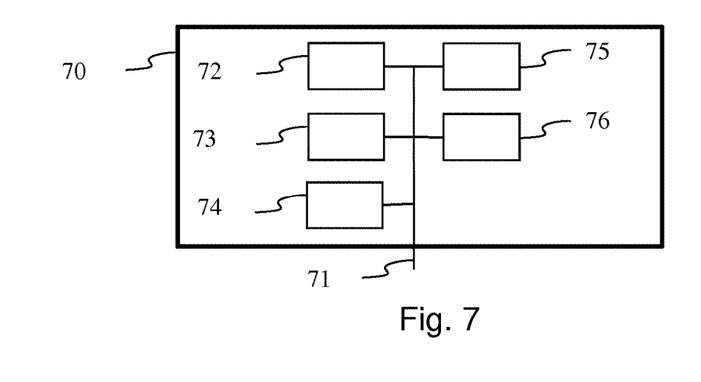
FIG. 7 illustrates an exemplary apparatus for implementing one of the methods disclosed herein according to an embodiment of the present principle.

FIG. 7 represents an exemplary architecture of a device 70 which may be configured to implement a method described in relation with FIGS. 1-6.

Device 70 comprises following elements that are linked together by a data and address bus 71:
- a microprocessor 72 (or CPU), which is, for example, a DSP (or Digital Signal Processor);
- a ROM (or Read Only Memory) 73;
- a RAM (or Random Access Memory) 74;

an I/O interface 75 for transmission and/or reception of data, from an application; and a battery 76.

According to a variant, the battery 76 is external to the device. Each of these elements of FIG. 7 are well-known by those skilled in the art and won't be disclosed further. In each of mentioned memory, the word «register» used in the specification can correspond to area of small capacity (some bits) or to very large area (e.g. a whole program or large amount of received or decoded data). ROM 73 comprises at least a program and parameters. Algorithm of the methods according to the disclosure is stored in the ROM 73. When switched on, the CPU 73 uploads the program in the RAM and executes the corresponding instructions.

RAM 74 comprises, in a register, the program executed by the CPU 72 and uploaded after switch on of the device 71, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

According to a specific embodiment of encoding or encoder, the HDR color picture is obtained from a source. For example, the source belongs to a set comprising:

a local memory (73 or 74), e.g. a video memory or a RAM (or Random Access Memory), a flash memory, a ROM (or Read Only Memory), a hard disk;

a storage interface, e.g. an interface with a mass storage, a RAM, a flash memory, a ROM, an optical disc or a magnetic support;

a communication interface (75), e.g. a wireline interface (for example a bus interface, a wide area network interface, a local area network interface) or a wireless interface (such as a IEEE 802.11 interface or a Bluetooth® interface); and a picture capturing circuit (e.g. a sensor such as, for example, a CCD (or Charge-Coupled Device) or CMOS (or Complementary Metal-Oxide-Semiconductor)).

According to different embodiments of the decoding or decoder, the HDR decoded picture is sent to a destination; specifically, the destination belongs to a set comprising:

a local memory (73 or 74), e.g. a video memory or a RAM (or Random Access Memory), a flash memory, a ROM (or Read Only Memory), a hard disk;

a storage interface, e.g. an interface with a mass storage, a RAM, a flash memory, a ROM, an optical disc or a magnetic support;

a communication interface (75), e.g. a wireline interface (for example a bus interface, a wide area network interface, a local area network interface) or a wireless interface (such as a IEEE 802.11 interface or a Bluetooth® interface); and a display.

According to different embodiments of encoding or encoder, the coded bitstream is sent to a destination. As an example, the coded bitstream is stored in a local or remote memory, e.g. a video memory (74) or a RAM (74), a hard disk (73). In a variant, the bitstream is sent to a storage interface, e.g. an interface with a mass storage, a flash memory, ROM, an optical disc or a magnetic support and/or transmitted over a communication interface (75), e.g. an interface to a point to point link, a communication bus, a point to multipoint link or a broadcast network.

According to different embodiments of decoding or decoder, the bitstream is obtained from a source. Exemplarily, the bitstream is read from a local memory, e.g. a video memory (74), a RAM (74), a ROM (73), a flash memory (73) or a hard disk (73). In a variant, the bitstream is received from a storage interface, e.g. an interface with a mass storage, a RAM, a ROM, a flash memory, an optical disc or a magnetic support and/or received from a communication interface (75), e.g. an interface to a point to point link, a bus, a point to multipoint link or a broadcast network.

According to different embodiments, device 70 being configured to implement an encoding method described in relation with FIG. 1, or 5, belongs to a set comprising:

a mobile device;

a communication device;

a game device;

a tablet (or tablet computer);

a laptop;

a still picture camera;

a video camera;

an encoding chip;

a still picture server; and a video server (e.g. a broadcast server, a video-on-demand server or a web server).

According to different embodiments, device 70 being configured to implement a decoding method described in relation with FIG. 2 or 6, belongs to a set comprising:

a mobile device;

a communication device;

a game device;

a set top box;

a TV set;

a tablet (or tablet computer);

a laptop;

a display and a decoding chip.

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and any other device for processing a picture or a video or other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for decoding at least one second dynamic range picture from a coded bitstream, the method comprising:
    decoding a first dynamic range picture from the coded bitstream;
    decoding a set of pivot points from the coded bitstream, the set of pivot points being representative of an adjustment function $f_{adj}$;
    selecting a predefined color correction function $b_{p\_default}$;
    determining an adjusted color correction function $b_{adj}$ to adjust the selected predefined color correction function $b_{p\_default}$;
    reconstructing the second dynamic range picture from the decoded first dynamic range picture and the adjusted color correction function $b_{adj}$, wherein the adjusted color correction function $b_{adj}$ is determined by:

$$1/b_{adj}[Y]=f_{adj}[Y]\times(1/b_{p\_default}[Y]),$$

where Y is a luminance value.

2. A method for coding at least one second dynamic range picture into a coded bitstream, the method comprising:
    decomposing the second dynamic range picture into a first dynamic range picture using at least a pre-processing color correction function $b_0$;
    determining a post-processing color correction function $b_p$ from the pre-processing color correction function $b_0$;
    selecting a predefined color correction function $b_{p\_default}$;
    determining an adjustment function $f_{adj}$ used to adjust the predefined color correction function $b_{p\_default}$ and an adjusted color correction function $b_{adj}$;
    encoding a set of pivot points into the coded bitstream, the set of pivot points being representative of the determined adjustment function $f_{adj}$;
    encoding the first dynamic range picture into the coded bitstream, wherein the adjusted color correction function $b_{adj}$ is determined by:

$$1/b_{adj}[Y]=f_{adj}[Y]\times(1/b_{p\_default}[Y]),$$

where Y is a luminance value.

3. The method according to claim 2, wherein determining the adjustment function $f_{adj}$ used to adjust the predefined color correction function $b_{p\_default}$ comprises performing a minimization of an error between $1/b_p$ and $1/b_{adj}$.

4. An apparatus for decoding at least a second dynamic range picture from a coded bitstream, comprising a memory and at least one processor configured to:
    decoding a first dynamic range picture from the coded; bitstream;
    decoding a set of pivot points from the coded bitstream, the set of pivot points being representative of an adjustment function $f_{adj}$;
    selecting a predefined color correction function $b_{p\_default}$;
    determining an adjusted color correction function $b_{adj}$ to adjust the selected predefined color correction function $b_{p\_default}$;
    reconstructing the second dynamic range picture from the decoded first dynamic range picture and the adjusted color correction function $b_{adj}$, wherein the adjusted color correction function $b_{adj}$ is determined by:

$$1/b_{adj}[Y]=f_{adj}[Y]\times(1/b_{p\_default}[Y]),$$

where Y is a luminance value.

5. The apparatus for decoding according to claim 4, wherein the apparatus for decoding is disposed in an electronic device.

6. The apparatus for decoding according to claim 5, wherein the electronic device is one of a mobile device, a communication device, a game device, a set top box, a TV set, a tablet, a laptop, a display, and a decoding chip.

7. An apparatus for encoding at least one second dynamic range picture into a coded bitstream, comprising a memory and at least one processor configured to:
decomposing the second dynamic range picture into a first dynamic range picture using at least a pre-processing color correction function $b_0$;
determining a post-processing color correction function $b_p$ from the pre-processing color correction function $b_0$;
selecting a predefined color correction function $b_{p\_default}$;
determining an adjustment function $f_{adj}$ used to adjust the predefined color correction function $b_{p\_default}$ and an adjusted color correction function $b_{adj}$;
encoding a set of pivot points into the coded bitstream, the set of pivot points being representative of the determined adjustment function $f_{adj}$;
encoding the first dynamic range picture into the coded bitstream, wherein the adjusted color correction function $b_{adj}$ is determined by:

$$1/b_{adj}[Y]=f_{adj}[Y]\times(1/b_{p\_default}[Y]),$$

where Y is a luminance value.

8. The apparatus for encoding according to claim 7, wherein the apparatus for encoding is disposed in an electronic device.

9. The apparatus for encoding according to claim 8, wherein the electronic device is one of a mobile device, a communication device, a game device, a tablet, a laptop, a still picture camera, a video camera, an encoding chip, a still picture server, and a video server.

10. The apparatus according to claim 7, wherein determining the adjustment function $f_{adj}$ used to adjust the predefined color correction function $b_{p\_default}$ comprises performing a minimization of an error between $1/b_p$ and $1/b_{adj}$.

11. A non-transitory computer-readable storage medium having stored instructions that, when executed by a processor, cause the processor to:
decode a first dynamic range picture from a coded bitstream;
decode a set of pivot points from the coded bitstream, the set of pivot points being representative of an adjustment function $f_{adj}$;
select a predefined color correction function $b_{p\_default}$;
determine an adjusted color correction function $b_{adj}$ to adjust the selected predefined color correction function $b_{p\_default}$;
reconstruct a second dynamic range picture from the decoded first dynamic range picture and the adjusted color correction function $b_{adj}$, wherein the adjusted color correction function ha is determined by:

$$1/b_{adj}[Y]=f_{adj}[Y]\times(1/b_{p\_default}[Y]),$$

where Y is a luminance value.

12. A non-transitory computer-readable storage medium having stored instructions that are operative, when executed by a processor, to cause the processor to:
decompose a second dynamic range picture into a first dynamic range picture using at least a pre-processing color correction function $b_0$;
determine a post-processing color correction function $b_p$ from the pre-processing color correction function $b_0$;
select a predefined color correction function $b_{p\_default}$;
determine an adjustment function $f_{adj}$ used to adjust the predefined color correction function $b_{p\_default}$ and an adjusted color correction function $b_{adj}$;
encode a set of pivot points into a coded bitstream, the set of pivot points being representative of the determined adjustment function $f_{adj}$;
encode the first dynamic range picture into the coded bitstream, wherein the adjusted color correction function $b_{adj}$ is determined by:

$$1/b_{adj}[Y]=f_{adj}[Y]\times(1/b_{p\_default}[Y]),$$

where Y is a luminance value.

\* \* \* \* \*

UNITED STATES PATENT AND TRADEMARK OFFICE
CERTIFICATE OF CORRECTION

PATENT NO. : 11,006,152 B2
APPLICATION NO. : 16/098861
DATED : May 11, 2021
INVENTOR(S) : Edouard Francois et al.

It is certified that error appears in the above-identified patent and that said Letters Patent is hereby corrected as shown below:

In the Claims

Claim 7, Column 17, Line 6: replace "decomposing" with --decompose--.
Claim 7, Column 17, Line 9: replace "determining" with --determine--.
Claim 7, Column 17, Line 11: replace "selecting" with --select--.
Claim 7, Column 17, Line 12: replace "determining" with --determine--.
Claim 7, Column 17, Line 15: replace "encoding" with --encode--.
Claim 7, Column 17, Line 18: replace "encoding" with --encode--.

Claim 11, Column 18, Line 13: replace "ha" with --$b_{adj}$--.

Signed and Sealed this
Twenty-third Day of August, 2022

Katherine Kelly Vidal
*Director of the United States Patent and Trademark Office*